United States Patent
Chai (10) Patent No.: US 6,393,138 B1
(45) Date of Patent: May 21, 2002

(54) METHOD OF CREATING REGISTRATION SIGNATURE DATA FOR COMPUTERIZED SIGNATURE COLLATION SCHEME

(75) Inventor: Toshiaki Chai, Tokyo (JP)

(73) Assignee: Cadix Inc., Tokyo (JP)

( * ) Notice: Subject to any disclaimer, the term of this patent is extended or adjusted under 35 U.S.C. 154(b) by 0 days.

(21) Appl. No.: 09/040,306

(22) Filed: Mar. 18, 1998

(30) Foreign Application Priority Data

Mar. 19, 1997 (JP) ............................................. 9-084724

(51) Int. Cl.[7] .............................. G06K 9/00; G06K 9/18; A61B 5/00; H04Q 5/22; H04N 7/18
(52) U.S. Cl. ........................ 382/119; 382/123; 382/160; 382/181; 382/186; 382/187; 382/218; 73/865.4; 340/5.82; 348/161
(58) Field of Search ................................ 382/120, 121, 382/122, 123, 186, 187, 119, 219, 115, 159, 160, 181, 218; 73/865.4; 178/18.01; 340/5.8, 5.81, 5.82; 348/161; 707/102; 902/3

(56) References Cited

U.S. PATENT DOCUMENTS

| 4,646,351 A | * | 2/1987 | Asbo et al. | ................. | 382/121 |
| 5,040,222 A | | 8/1991 | Muroya | ....................... | 382/123 |
| 5,111,512 A | * | 5/1992 | Fan et al. | .................... | 382/122 |
| 5,202,930 A | * | 4/1993 | Livshitz et al. | ............. | 382/122 |
| 5,559,895 A | * | 9/1996 | Lee et al. | .................... | 382/119 |
| 5,689,567 A | * | 11/1997 | Miyauchi | ..................... | 713/176 |
| 5,802,200 A | * | 9/1998 | Wirtz | ......................... | 382/120 |

FOREIGN PATENT DOCUMENTS

| EP | 0 391 044 | | 10/1990 |
| EP | 0523908 A2 | * | 3/1993 |
| EP | 0 539 739 | | 5/1993 |
| EP | 0 567 836 | | 11/1993 |
| GB | 2 271 657 | | 4/1994 |

OTHER PUBLICATIONS

Achemlal, et al "Dynamic Signature Verification", elsevier science publishers B. V. (North Hollnd), pp. 381–389, 1989.*
C. N. Liu, IBM Technical Disclosure Bulletin, vol. 21, No. 1, pp. 426 and 427, "Reference Disign Procedure for Signature Verification", Jun. 1978.

* cited by examiner

Primary Examiner—Leo Boudreau
Assistant Examiner—Daniel G. Mariam
(74) Attorney, Agent, or Firm—Oblon, Spivak, McClelland, Maier & Neustadt, P.C.

(57) ABSTRACT

A method of creating registration signature data for a computerized signature collation scheme. A plurality of signature data sets are averaged in order to calculate a candidate set of registration signature data. The candidate set of registration signature data is collated with each signature data set. When no unacceptable discrepancy is found as a result of collation between the candidate set of registration signature data and the signature data sets, the candidate set of registration signature data is treated as registration signature data.

18 Claims, 6 Drawing Sheets

METHOD OF CREATING REGISTRATION SIGNATURE DATA FOR COMPUTERIZED SIGNATURE COLLATION SCHEME

BACKGROUND OF THE INVENTION

1. Field of the Invention

The present invention relates to a method of creating registration signature data in a signature collation system. More particularly, the present invention relates to a method of creating registration signature data in a system in which attestation of a person is performed based on the dynamic characteristics of a signature.

2. Description of the Related Art

A handwritten character recognition method by which written characters are recognized has been utilized as an input method for word processors or a signature collation method for specifying a writer. Under a handwritten character recognition method which has already been in actual use as an input method, characters are input in the block style under specified constraints on the style of typeface, and the thus-input characters are converted into coordinate information. The thus-converted coordinate information is verified by comparison with coordinate information relating to character data which have been stored beforehand. As a result of collation, the characters are recognized as matched. If characters are carefully written in the block style at comparatively slow speed in the manner as previously described, the characters can be sufficiently recognized through use of only coordinate information because under such conditions each of the strokes of the characters becomes clear by virtue of visual feedback to the writer and hence the shape of the characters becomes stable.

In contrast, in a case where the character recognition method is applied to an input method which does not pose any restriction on the style of typeface at the time of input of characters or to a signature collation method, there must be recognized not only characters written in the block type but also cursively written characters. When characters are cursively written, writing motion becomes faster and does not involve any substantial visual feedback to the writer. In this case, the characters become less identifiable, and separation of a resultantly acquired pattern into strokes becomes difficult. This is because an expansion or contraction of the pattern in the direction of the time axis or in the direction of stroke, or the difference between the input pattern and a pre-registered pattern, becomes greater. For this reason, a matching rate is extremely low, rendering identification of characters difficult.

Another method is to enable recognition of characters without involving the separation of characters into strokes by application of time-series coordinate information and writing pressure. This method employs a pattern matching information stemming from variations in writing action.

In the dynamic processing matching technique, variations in the writing motion are corrected with regard to the time axis or the arc length axis through use of a warping function which minimizes a cumulative error between patterns to be checked. Patterns are matched with each other on the basis of the coordinates and writing pressure that have been corrected so as to compensate variations in the writing motion, thereby enabling recognition of cursively handwritten characters.

Verification based on the addition of writing pressure information to time-series coordinate information or normalization of input patterns by DP matching contributes to an improvement in the recognition rate of handwritten characters. However, in the case of application of the dynamic processing matching technique to recognition of cursively written characters or signature collation, a false signature may be erroneously recognized as a genuine signature. Therefore, in its present form, the dynamic processing matching technique cannot be put into practical use.

Japanese Patent No. 1,822,532 [Japanese Patent Publication (kokoku) No. 5-31798] entitled "A Method of Recognizing Handwritten Characters Online" describes a practical technique that is based on dynamic processing matching. Under this method, when the degree of difference between a registered pattern and an input pattern of handwritten characters is calculated by use of dynamic processing matching, time-series coordinate information and writing pressure information are simultaneously processed by the assignment of optimum weighting coefficients to the time-series coordinate information and writing pressure information. As a result, the difference is reduced, which in turn contributes to an improvement in the collation rate of authenticity and a reduction in processing time.

As mentioned previously, even in the case of unclear characters which cannot be separated into strokes, processing of the time-series coordinate information and writing pressure information relating to handwritten characters enables recognition of the characters. Further, even in the case of cursively handwritten characters, the characters can be recognized in practice, as a result of a further improvement in the dynamic processing matching technique that compensates variations in writing motion in order to correct cumulative errors.

Figure 1:
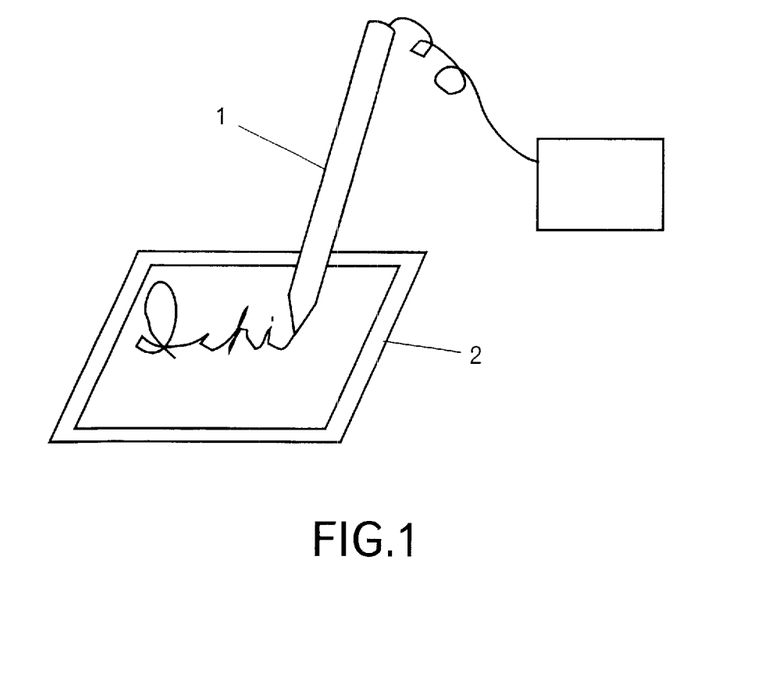
FIG. 1 is a procedure of an online handwritten character recognition according to a conventional technique.

In a static signature collation system, an image scanner or an image OCR is used as a tool for reading out characters. In contrast, in a dynamic signature collation system, a stylus pen is generally used. FIG. 1 shows a schematic view of a dynamic signature collation system utilizing a stylus pen. When characters are written on a tablet 2 through use of a stylus pen 1, signals representing characters are sent to a collation section, where signature collation is performed.

Such a tablet and stylus pen are important devices that affect ease of use. Therefore, recently these devices have been improved. For example, a tablet formed from a liquid-crystal panel and a wireless stylus pen having no signal cable have come into use. Further, in place of a piece of hardware dedicated to signature collation, a personal computer has come into use. In this case, signature collation is performed by software or a program.

The processing performed in the collation section is composed of three steps; i.e., pre-processing/normalization, character extraction, and identification/judgment. Information from the stylus pen includes relative coordinates (x, y) relative to the start point of a signature, and writing pressure p. Specifically, information as shown in Table 1 is obtained every unit time.

TABLE 1

| t | x | y | p |
|---|---|---|---|
| $t_1$ | $x_1$ | $y_1$ | $p_1$ |
| $t_2$ | $x_2$ | $y_2$ | $p_2$ |
| $t_3$ | $x_3$ | $y_3$ | $p_3$ |
| . | . | . | . |
| . | . | . | . |
| . | . | . | . |

Since handwritten characters are not necessarily consistent, collation of a signature involves difficulty caused by variation in the direction of writing and in size, and hardware noise. The pre-processing/normalization removes these variations and noise and performs normalization in order to enable comparison with standard character patterns. Specifically, in the pre-processing, there are performed removal of excess series of points (sampling based on amount of relative movement), removal of random noise that depends on hand shake and resolution of a tablet (smoothing through load shift), removal of isolated data caused by erroneous operation of the tablet, and like operations.

Figure 2:
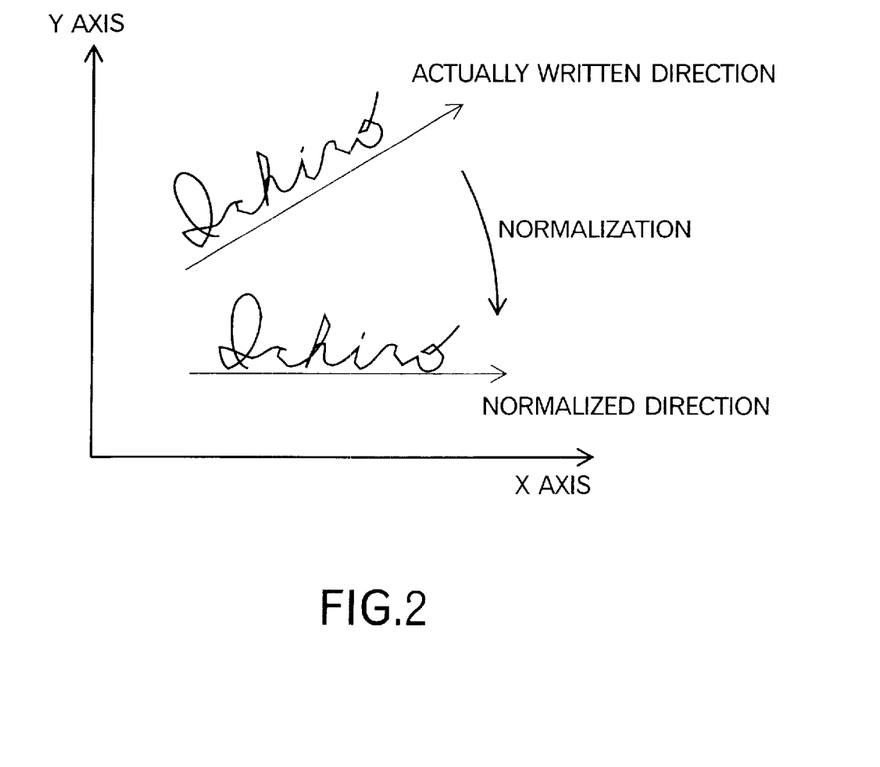
FIG. 2 is an illustration showing normalization of characters according to a conventional technique.

After completion of the pre-processing, as shown in FIG. 2, the size and position of input characters are normalized. Subsequent to the above-described processing, characteristics of the characters are extracted, and identification/judgment processing is performed.

In Japan, seals have been accepted with absolute trust as means for personal authentication for settlements at financial institutions, agreements, and the like. By contrast, handwritten signatures have not been authorized as means for personal authentication as is the practice in western countries. However, since computerization and enhancement of communication techniques have advanced worldwide in various fields, personal authentication by means of seals has been found troublesome with regard to international transactions and future computerization in Japan.

Although seals are considered secure when a person imprints his/her own seal, seals are highly insecure in the field of computerized personal authentication, because in a computerized system a seal constitutes fixed data, and therefore there exists a high risk that the seal may be stolen and abused by a third person. To say nothing of the Internet, other computer networks have expanded worldwide, and computer communications are utilized in a wide range of fields such as formulation of business contracts, shopping, home banking, and bank settlement. The range of application of computer communications has been expanded. Seals, which are static identification tools, can no longer cope with such circumstances, and it is easily imagined that dynamic personal authentication based on a handwritten signature will become indispensable.

As described above, in recent years, there has rapidly developed a signature-based personal authentication technique that is practiced through use of a computer. However, computerized signature-based personal authentication involves many problems that remain to be solved.

In order to solve the problems, a personal authentication technique utilizing biometrics has recently been proposed. A basic principle states that the stricter the check of personal authentication, the more reliable the result. However, when the check is excessively strict, there arises a possibility that a person cannot be properly identified. A factor that causes such a problem is initial registration signature data that is used as a basis for collation of signature data.

Dynamic signatures or handwritten signatures vary among persons. Some persons can sign consistently and others cannot. A person signs differently depending on his/her mental state and environment. For example, when experiencing tension, a person generally writes characters at a slower speed with an increased writing pressure. If a signature made by a certain person is not identified as being signed by that person, this poses a problem; personal authentication that cannot identify the true signer is meaningless.

The action of writing characters is greatly affected by mental state, physical state, environment, and the like. Conventionally, registration data that are used as a reference for collation of signature data are input one time or a plurality of times. Conventionally, the input signature data are stored in their raw form as registration signature data. Therefore, if the signer forgets the style of the registered signature, or if the form of characters changes due to the conditions of the signer, the signer him/herself may be rejected as well as other persons.

In a conventional method of creating registration data, one or a plurality of sets of signature data are registered as registration signature data, and collation of input signature data is performed through use of the registration signature data. However, this method still has a drawback that collation cannot be performed reliably because of the above-described reasons.

SUMMARY OF THE INVENTION

Therefore, an object of the present invention is to provide a method of creating registration signature data which enables reliable collation in a computerized signing scheme, particularly in a dynamic signing scheme.

To accomplish the foregoing object, in the present invention, registration signature data that are used as a basis for signature collation are created through the steps of:

(1) averaging a plurality of signature data sets in order to calculate a candidate set of registration signature data;

(2) collating the candidate set of registration signature data with each signature data set;

(3) when no unacceptable discrepancy is found as a result of collation between the candidate set of registration signature data and the signature data sets, treating the candidate set of registration signature data as registration signature data; and (4) when at least one unacceptable discrepancy is found as the result of collation between the candidate set of registration signature data and the signature data sets, repeating the steps (1) and (2) in order to find a candidate set of registration signature data for which no unacceptable discrepancy is found as a result of collation with the signature data sets, and treating the candidate set of registration signature data as registration signature data.

Instead of the above-described method in which data creation is repeated until a desired result is obtained, there can be employed a method comprising the steps of:

(1) averaging a plurality of signature data sets in order to calculate a candidate set of registration signature data;

(2) collating the candidate set of registration signature data with each signature data set;

(3) when no unacceptable discrepancy is found as a result of collation between the candidate set of registration signature data and the signature data sets, treating the candidate set of registration signature data as registration signature data; and (4) when at least one unacceptable discrepancy is found as a result of collation between the candidate set of registration signature data and the signature data sets; inputting an additional signature data set; forming a plurality of groups each consisting of signature data sets selected from the increased number of signature data sets such that the number of signature data sets in each group is less than the total number of signature data sets; collating a candidate set of registration signature data that is obtained by averaging the signature data sets in each group with each signature data set; and treating as registration signature data the candidate set of registration signature data of a group that produces the best collation result.

Preferably, a signer is allowed to determine whether input signature data is to be used for creation of the registration signature data. Further, a practice mode is preferably provided for a person unfamiliar with signing in order to provide him/her with the opportunity to sign a plurality of times before making signatures for creation of the registration signature data.

In the present invention, since signatures of each person are averaged, reliable collation results can be obtained. Further, in the method in which a group that provides the best collation result is selected for registration, more consistent collation results can be obtained. The registration method of the present invention is particularly effective for creation of registration signature data in a signature collation scheme in which information other than the shape of characters is used, such as a dynamic signature collation scheme.

DESCRIPTION OF THE PREFERRED EMBODIMENT

Figure 3:
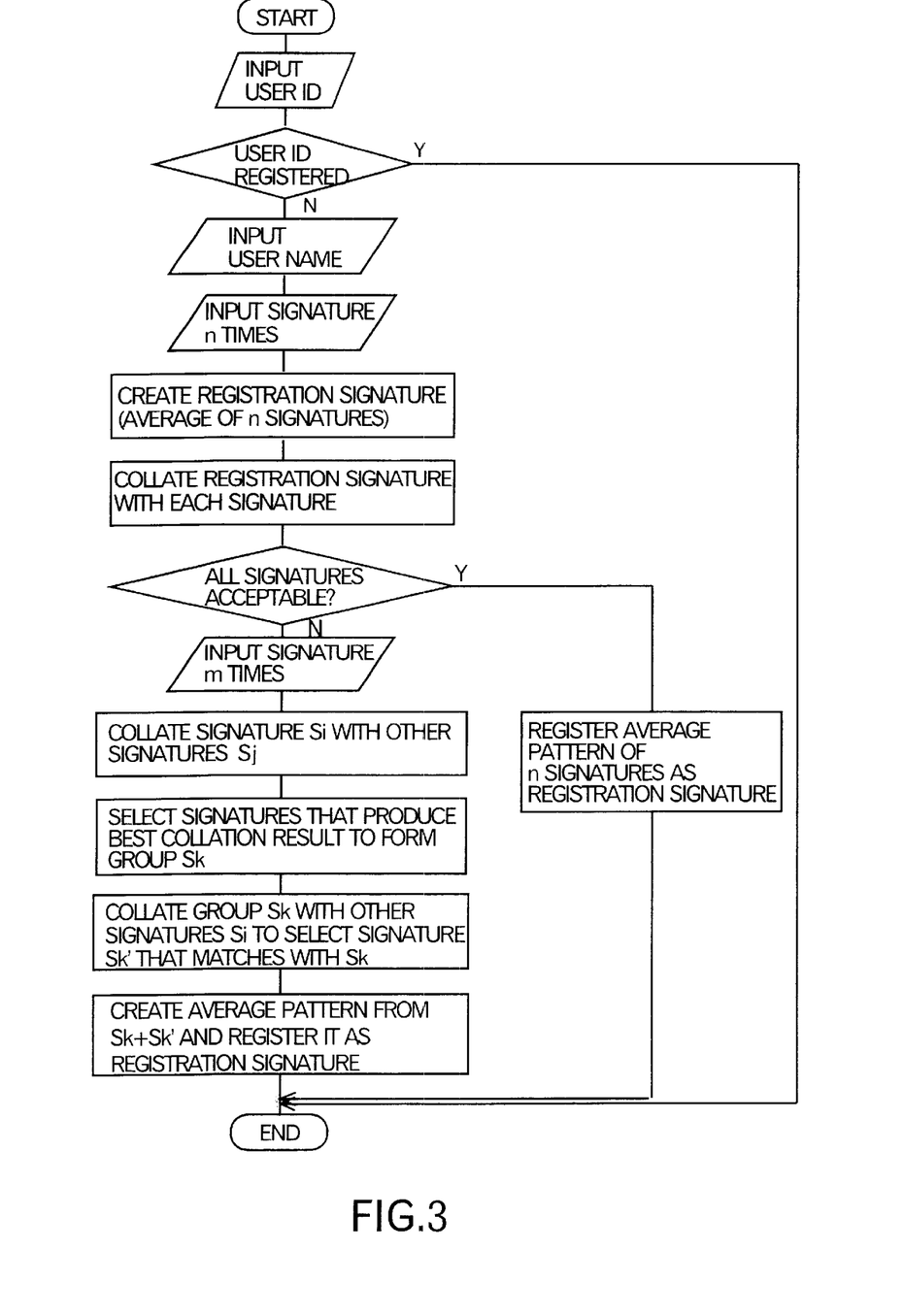
FIG. 3 is a flowchart showing a method of creating registration signature data according to an embodiment of the present invention.

An embodiment of the present invention will be described with reference to the flowchart shown in FIG. 3. Since the procedure shown in the flowchart of FIG. 3 is basically the same as that described in the SUMMARY OF THE INVENTION section, only main points will be described. In FIG. 3, the subscripts i and j of Si and Sj take values in the rang of 1 to (1+m).

User IDs (user identification data) and passwords are generally used for personal authentication. For example, a depositor uses a user ID and a password in order to withdraw a deposit from his/her bank. Since the user ID is generally recorded on a card, the user inputs the password only. By contrast, in the case of credit cards a signature is used instead of a password . The procedure illustrated in FIG. 3 is designed to register a user ID and a user name. In a more secure computer system, a password may be added for personal authentication.

When the user ID has not yet been registered, no signature has been registered. Therefore, processing for signature registration is started. In this case, a user is first requested to sign a few times. In the flowchart shown in FIG. 3, the number of times is n. The n signatures are averaged to obtain an average signature pattern; i.e., a candidate set of registration signature data. The candidate set of registration signature data is compared or collated with each signature data set. When collation shows that each of the signatures has a matching rate not lower than a predetermined acceptable level, the candidate set of registration signature data is formally registered as registration signature data. In the case of a person whose signatures are consistent, the processing for signature registration is ended here.

When at least one of the signatures has a matching rate lower than the acceptable level, the user is requested to sign m additional times. At this step, there exist (n+m) signature data sets, including the previously input signature data sets. From the (n+m) signature data sets, one signature data set is selected for comparison with other signature data sets. This processing is performed for all the signature data sets, and a plurality of signatures providing a best collation result are selected (specifically, a plurality of signatures are selected in descending order of matching rate). The selected signatures are averaged to obtain a candidate set of registration signature data. Further, this candidate set of registration signature data is compared with other signature data sets in order to find a signature data set or sets that match with the candidate set of registration signature data. The candidate set of registration signature data and the selected signature data sets are averaged so as to create the registration signature data and are registered in a master.

Figure 4:
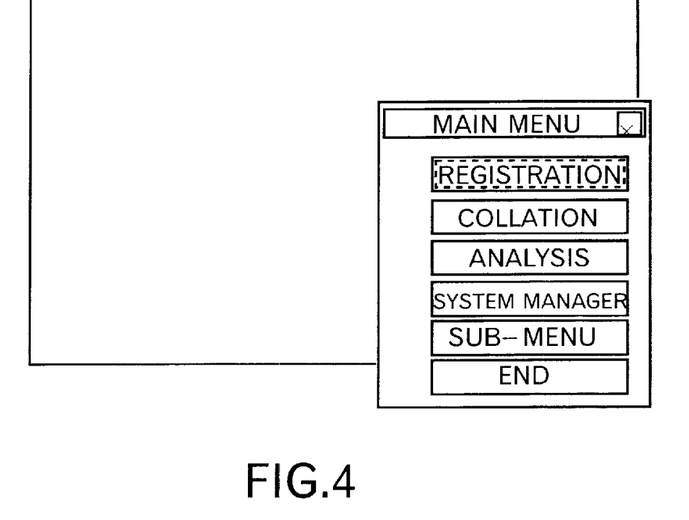
FIG. 4 is a main menu of a signature collation system according to the embodiment of the present invention.
Figure 5:
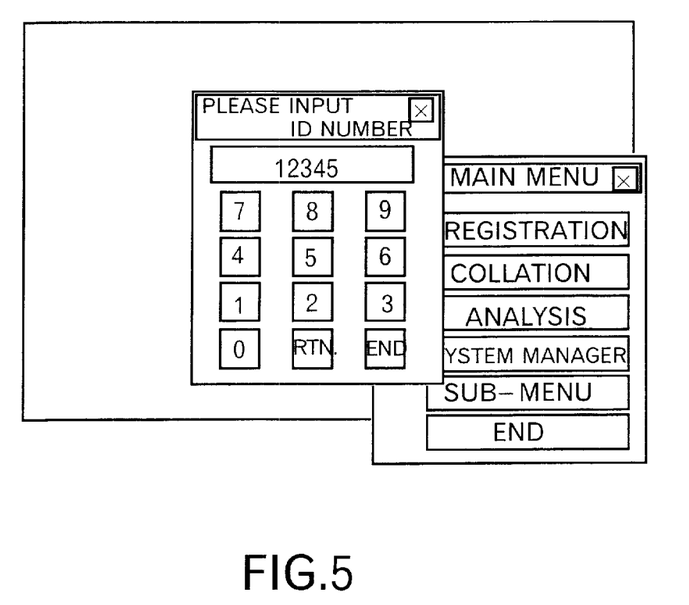
FIG. 5 is a menu for requesting input of a user ID in the embodiment of the present invention.
Figure 6:
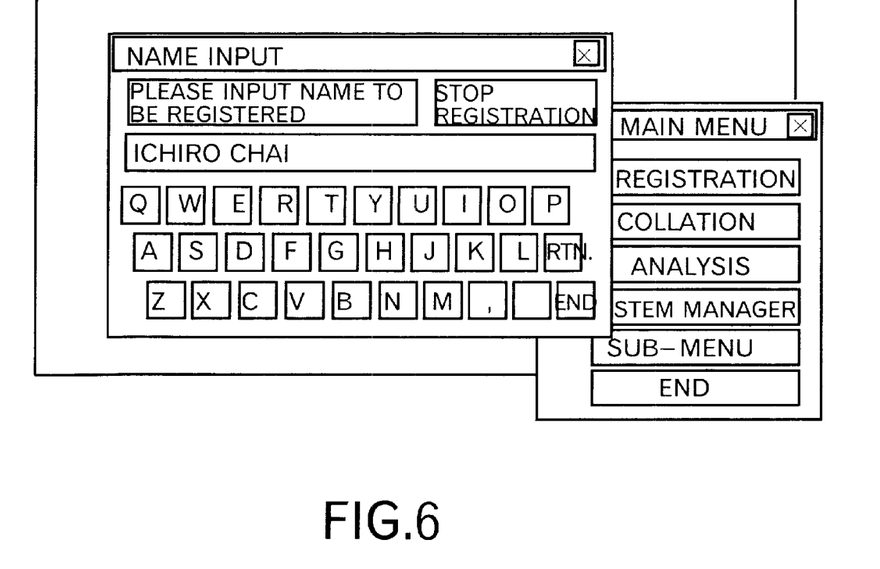
FIG. 6 is a menu for requesting input of a name in the embodiment of the present invention.

An example of the present invention will be next described with reference to actual display screens. FIG. 4 shows a main menu of the signature collation system. When "REGISTRATION" is selected, an input menu (FIG. 5) for requesting input of a personal identification number (user ID) is displayed. When a user ID is input at this time, the system searches a master DB in order to check whether the user ID has been registered. When the user ID has been registered, the system ends the registration processing and returns to the main menu. When the user ID has not yet been registered, the system continues the registration processing. As a result, a menu (window) for registration of a name is displayed to start name registration (FIG. 6).

Figure 7:
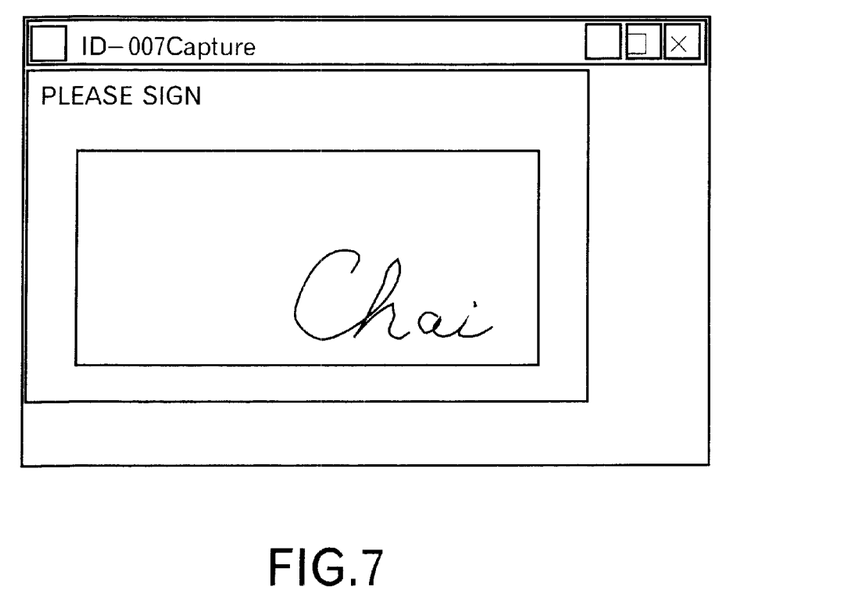
FIG. 7 is a menu for requesting input of a signature in the embodiment of the present invention.
Figure 8:
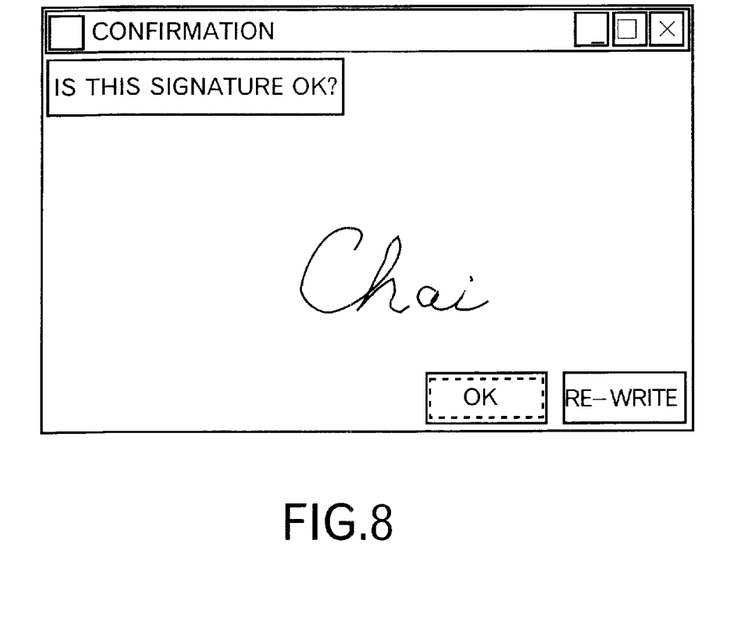
FIG. 8 is a screen for confirming the input signature in the embodiment of the present invention.

After completion of the above-processing, the signature registration processing of the present invention is started. FIG. 7 shows a screen that requests the user to sign. When the user signs, the signature is displayed on the screen as an echo. The signature may be made through use of the stylus pen and the tablet shown in FIG. 1, or a touch-panel type liquid crystal display. Every time a signature is made, a confirmation screen as shown in FIG. 8 is displayed. When a "re-write" button is selected, the signature is made invalid, and the user is requested to input his/her signature again (FIG. 7).

That is, the user can practice signatures any number of times. However, since signatures that the user makes under ordinary conditions are considered to be of higher quality, the re-writing of a signature sometimes generates an unfavorable result. When a "OK" button is selected, the signature data becomes a candidate set of registration signature data. This signing operation is repeated three times.

Figure 9:
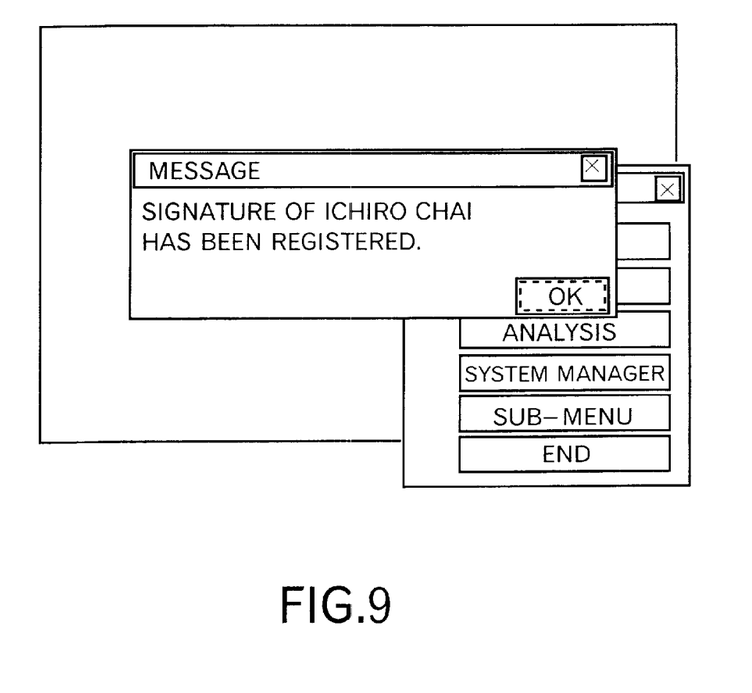
FIG. 9 is a screen for indicating completion of signature registration in the embodiment of the present invention.
Figure 10:
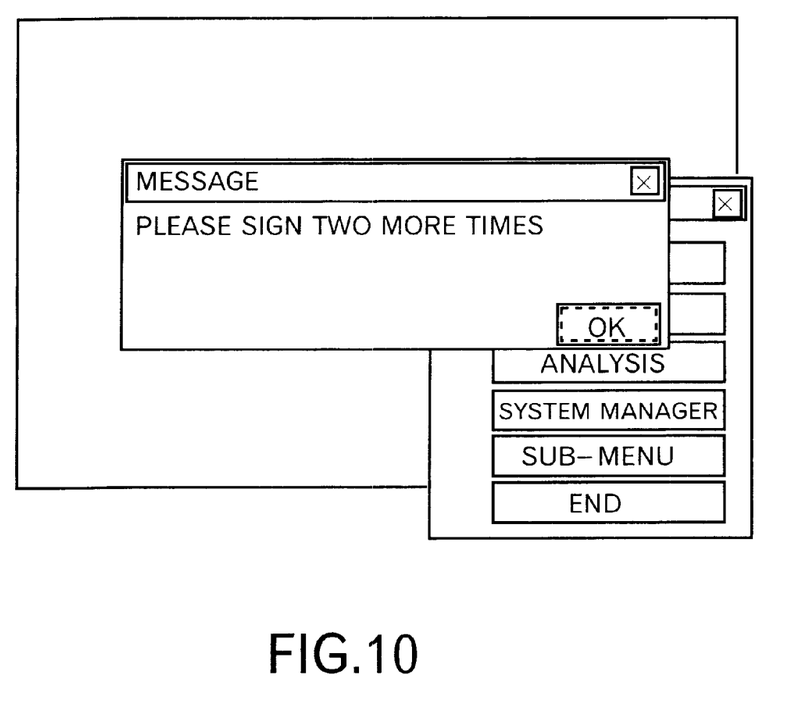
FIG. 10 is a menu for requesting re-input of a signature in the embodiment of the present invention.

When these three signatures are judged acceptable by the above-described judging method, the message shown in FIG. 9 is displayed and the signature registration is completed. When the signatures are not acceptable, the message shown in FIG. 10 is displayed, and the user is requested to sign two more times. A signature that provides a good collation result is extracted from the five signatures, and registration signature data are created based on the extracted signatures.

In the above-described example, the flowchart shown in FIG. 3 is performed while n and m are respectively set to 3 and 2. As is apparent from the example, for a person familiar with signatures, signature registration can be finished through fewer signatures, whereas for a person unfamiliar with signatures, reliable signature data sets are selected from a larger number of sample signatures in order to enable reliable collation.

As typified by the Internet, computer communications now exhibit worldwide expansion. In order to cope with this phenomenon, applications utilizing computer communications have expanded rapidly. For example, home shopping, home banking, and formulation of business contracts through use of the Internet have entered into an experimental phase or come into practical use.

In such computer communications, maintaining security will become more important. Even now, computer crimes such as invasion of a host computer by a so-called hacker occur one after another. Therefore, home shopping, home banking, or bank settlement through computer communications cannot become widely accepted unless users are protected from such crimes.

In such circumstances, personal identification and authentication have become important. There have been proposed two schemes for the personal identification and authentication. One scheme is a password scheme utilizing encryption. The other scheme utilizes biometrics. In the latter scheme, patterns in the iris, DNA, fingerprints, or the like are used. However, the feasibility of this scheme is low. By contrast, a method utilizing a handwritten signature; i.e., a dynamic signature, which is a biometric method, has gained recognition as the personal authentication method having the highest feasibility, because the method is the simplest and is based on characteristics unique to each person.

However, in conventional schemes, collation cannot be performed reliably, because signature data stored during an initial operation have been used as a reference for collation, and the registration signature data have not been prepared in consideration of effects on the signature exerted by the mental and physical state of a signer and the surrounding environment when the signature is made. By contrast, in the present invention, variation in signatures is checked at the time of registration, and registration signature data are created in an optimal form in which variation in signatures is absorbed. Therefore, reliable collation can be performed.

Further, in the present invention, registration processing is designed to absorb differences between persons in terms of familiarity with making a signature. For example, a person familiar with making a signature can create registration signature data through fewer operations. A person unfamiliar with making a signature is requested to sign a larger number of times in order to create registration signature data. Registered signature data prepared in a conventional manner can be used sufficiently for a person familiar with making a signature. However, for a person unfamiliar with making a signature, reliable signature collation cannot be performed unless registration signature data are prepared in accordance with the method of the present invention. Since personal authentication utilizing dynamic signatures is expected to become more widely used in the future by persons who are unfamiliar with making signatures, the method of creating registration signature data according to the present invention is highly important.

What is claimed is:

1. A method of creating registration signature data for a computerized signature collation scheme, said method comprising the steps of:
   (1) obtaining a group of signature data sets input through a person's signing operation;
   (2) averaging the group of signature data sets in order to calculate a candidate set of registration signature data; and
   (3) collating the candidate set of registration signature data with each signature data set in the group, and when no unacceptable discrepancy is found as a result of collation between the candidate set of registration signature data and the signature data sets in the group, treating the candidate set of registration signature data as registration signature data.

2. A method of creating registration signature data according to claim 1, wherein a signer is allowed to determine whether input signature data is to be used for creation of the registration signature data.

3. A method of creating registration signature data according to claim 2, wherein the computerized signature collation scheme is a dynamic signature collation scheme.

4. A method of creating registration signature data according to claim 1, further comprising a practicing step for allowing a signer to sign an arbitrary number of times as practice before making signatures for creation of the registration signature data.

5. A method of creating registration signature data according to claim 4, wherein the computerized signature collation scheme is a dynamic signature collation scheme.

6. A method of creating registration signature data according to claim 1, wherein the computerized signature collation scheme is a dynamic signature collation scheme.

7. A method of creating registration signature data for a computerized signature collation scheme, said method comprising the steps of:
   (1) obtaining a group of signature data sets input through a person's signing operation;
   (2) averaging the group of signature data sets in order to calculate a candidate set of registration signature data; and
   (3) collating the candidate set of registration signature data with each signature data set in the group;
   (4) when a result of collation indicates that the candidate set of registration signature data matches each of the signature data sets in the group with a matching rate greater than a predetermined level, treating the candidate set of registration signature data as registration signature data; and
   (5) when at least one matching rate not greater than the predetermined level is found as the result of collation between the candidate set of registration signature data and the signature data sets, repeating the steps (1) and (2) in order to find a candidate set of registration signature data which matches each of the signature data sets in the group with a matching rate greater than the predetermined level, and treating the candidate set of registration signature data as registration signature data.

8. A method of creating registration signature data according to claim 7, wherein a signer is allowed to determine whether input signature data is to be used for creation of the registration signature data.

9. A method of creating registration signature data according to claim 8, wherein the computerized signature collation scheme is a dynamic signature collation scheme.

10. A method of creating registration signature data according to claim 7, further comprising a practicing step for allowing a signer to sign an arbitrary number of times as practice before making signatures for creation of the registration signature data.

11. A method of creating registration signature data according to claim 10, wherein the computerized signature collation scheme is a dynamic signature collation scheme.

12. A method of creating registration signature data according to claim 7, wherein the computerized signature collation scheme is a dynamic signature collation scheme.

13. A method of creating registration signature data for a computerized signature collation scheme, said method comprising the steps of:

(1) obtaining a group of signature data sets input through a person's signing operation;

(2) averaging the group of signature data sets in order to calculate a candidate set of registration signature data;

(3) collating the candidate set of registration signature data with each signature data set in the group;

(4) when no unacceptable discrepancy is found as a result of collation between the candidate set of registration signature data and the signature data sets in the group, treating the candidate set of registration signature data as registration signature data; and (5) when at least one unacceptable discrepancy is found as the result of collation between the candidate set of registration signature data and the signature data sets in the group;

obtaining an additional signature data set input through a person's signing operation;

forming a plurality of groups each consisting of signature data sets selected from the increased number of signature data sets such that the number of signature data sets in each group is less than the total number of signature data sets;

collating a candidate set of registration data that is obtained by averaging the signature data sets in each group with each signature data set; and treating as registration signature data the candidate set of registration data of a group that produces the best collation result.

14. A method of creating registration signature data according to claim 13, wherein a signer is allowed to determine whether input signature data is to be used for creation of the registration signature data.

15. A method of creating registration signature data according to claim 14, wherein the computerized signature collation scheme is a dynamic signature collation scheme.

16. A method of creating registration signature data according to claim 13, further comprising a practicing step for allowing a signer to sign an arbitrary number of times as practice before making signatures for creation of the registration signature data.

17. A method of creating registration signature data according to claim 16, wherein the computerized signature collation scheme is a dynamic signature collation scheme.

18. A method of creating registration signature data according to claim 13, wherein the computerized signature collation scheme is a dynamic signature collation scheme.

* * * * *